US009483768B2

(12) United States Patent
Singh

(10) Patent No.: US 9,483,768 B2
(45) Date of Patent: Nov. 1, 2016

(54) METHODS AND APPARATUSES FOR MODELING CUSTOMER INTERACTION EXPERIENCES

(71) Applicant: 24/7 Customer, Inc., Campbell, CA (US)

(72) Inventor: Bhupinder Singh, Bangalore (IN)

(73) Assignee: 24/7 CUSTOMER, INC., Campbell, CA (US)

( * ) Notice: Subject to any disclaimer, the term of this patent is extended or adjusted under 35 U.S.C. 154(b) by 0 days.

(21) Appl. No.: 14/822,827

(22) Filed: Aug. 10, 2015

(65) Prior Publication Data

US 2016/0042359 A1     Feb. 11, 2016

Related U.S. Application Data

(60) Provisional application No. 62/036,004, filed on Aug. 11, 2014.

(51) Int. Cl.
| | |
|---|---|
| *G06F 17/28* | (2006.01) |
| *G06Q 30/00* | (2012.01) |
| *G06F 17/27* | (2006.01) |
| *G06Q 10/06* | (2012.01) |
| *G10L 25/63* | (2013.01) |

(52) U.S. Cl.
CPC ......... *G06Q 30/016* (2013.01); *G06F 17/2785* (2013.01); *G06F 17/289* (2013.01); *G06Q 10/067* (2013.01); *G10L 25/63* (2013.01)

(58) Field of Classification Search
CPC .. G06F 17/27; G06F 17/2705; G06F 17/275; G06F 17/2785; G06F 17/28; G06F 17/2809; G06F 17/2818; G06F 17/2836; G06F 17/2863; G06F 17/2872; G06F 17/289; G06F 17/20; G06F 17/21; G06F 17/22
USPC .......................... 704/2, 4, 5, 7, 8, 9, 10, 277
See application file for complete search history.

(56) References Cited

U.S. PATENT DOCUMENTS

| | | | |
|---|---|---|---|
| 6,275,806 B1* | 8/2001 | Pertrushin | G10L 17/26 704/270 |
| 8,433,580 B2* | 4/2013 | Sugiyama | G06F 17/28 704/2 |
| 2001/0029455 A1 | 10/2001 | Chin et al. | |
| 2001/0042073 A1 | 11/2001 | Saether et al. | |
| 2009/0222313 A1 | 9/2009 | Kannan et al. | |
| 2014/0303981 A1* | 10/2014 | Skiba | H04M 3/5175 704/270 |
| 2014/0324541 A1* | 10/2014 | Malik | G06Q 30/0203 705/7.32 |

\* cited by examiner

*Primary Examiner* — Qi Han
(74) *Attorney, Agent, or Firm* — Perkins Coie LLP

(57) ABSTRACT

A computer-implemented method and an apparatus for modeling customer interaction experiences receives interaction data corresponding to one or more interactions between a customer and a customer support representative. At least one language associated with the interaction data is detected. Textual content in a plurality of languages is generated corresponding to the interaction data based at least in part on translating the interaction data using two or more languages different than the at least one language. At least one emotion score is determined for text corresponding to each language from among the plurality of languages. An aggregate emotion score is determined using the at least one emotion score for the text corresponding to the each language. An interaction experience of the customer is modeled based at least in part on the aggregate emotion score.

20 Claims, 5 Drawing Sheets

METHODS AND APPARATUSES FOR MODELING CUSTOMER INTERACTION EXPERIENCES

CROSS REFERENCE TO RELATED APPLICATIONS

This application claims priority to U.S. provisional patent application Ser. No. 62/036,004, filed Aug. 11, 2014, which is incorporated herein in its entirety by this reference thereto.

TECHNICAL FIELD

The invention generally relates to modeling of customer interaction experiences and, more particularly, to a method and apparatus for predicting customer net experience scores to facilitate modeling of customer interaction experiences.

BACKGROUND

Customers typically interact with customer support representatives for inquiring about a product or a service, for receiving purchase assistance, for receiving answers to queries, for raising concerns and the like. The customers and the customer support representatives may interact with each other using voice or text based interaction channels.

In some example scenarios, the customers and/or the customer support representatives, such as agents, may fill-up surveys outlining their experiences corresponding to the interactions. The data included in the surveys is typically used for predicting a level of service provisioned to the customers.

In some scenarios, a metric commonly referred to as a net experience score (NES) is predicted as a measure of quality of the customer experience afforded to the customer during an interaction between the customer and the customer support representative. Typically, the prediction of NES involves identifying if an interaction is associated with a positive sentiment or a negative sentiment based on customer/agents comments in the survey and/or analysis of interaction variables, such as customer responsiveness, overall time spent in the interaction and the like.

It is desirable to consider a range of complex emotions, such as for example, emotions like anger, sarcasm, frustration, delight, humor and the like, while predicting NES to improve an accuracy of the predicted NES.

Moreover, because interactions between the customers and the customer support representatives, nowadays, increasingly involve code-mixed content, i.e. multi-lingual content, it is desirable to predict NES while taking into account a presence of multiple languages in conversational data to predict NES with better accuracy and model customer experiences more effectively.

SUMMARY

In an embodiment of the invention, a computer-implemented method for modeling customer interaction experience includes receiving, by a processor, interaction data corresponding to one or more interactions between a customer and a customer support representative. The method detects, by the processor, at least one language associated with the interaction data. The method generates, by the processor, textual content in a plurality of languages corresponding to the interaction data based at least in part on translating the interaction data using two or more languages different than the at least one language. At least one emotion score is determined for text corresponding to each language from among the plurality of languages. An aggregate emotion score is determined using the at least one emotion score for the text corresponding to the each language. The method models, by the processor, an interaction experience of the customer based at least in part on the aggregate emotion score.

In another embodiment of the invention, an apparatus for modeling customer interaction experience includes at least one processor and a memory. The memory stores machine executable instructions therein, that when executed by the at least one processor, cause the apparatus to receive interaction data corresponding to one or more interactions between a customer and a customer support representative. The apparatus detects at least one language associated with the interaction data. The apparatus generates textual content in a plurality of languages corresponding to the interaction data based at least in part on translating the interaction data using two or more languages different than the at least one language. generates textual content in a plurality of languages corresponding to the interaction data based at least in part on translating the interaction data using two or more languages different than the at least one language. At least one emotion score for text corresponding to each language from among the plurality of languages is determined. An aggregate emotion score is determined using the at least one emotion score for the text corresponding to the each language. The apparatus models an interaction experience of the customer based at least in part on the aggregate emotion score.

In another embodiment of the invention, a non-transitory computer-readable medium storing a set of instructions that when executed cause a computer to perform a method for modeling customer interaction experience is disclosed. The method executed by the computer receives interaction data corresponding to one or more interactions between a customer and a customer support representative. The method detects at least one language associated with the interaction data. The method generates textual content in a plurality of languages corresponding to the interaction data based at least in part on translating the interaction data using two or more languages different than the at least one language. At least one emotion score is determined for text corresponding to each language from among the plurality of languages. An aggregate emotion score is determined using the at least one emotion score for the text corresponding to the each language. The method models an interaction experience of the customer based at least in part on the aggregate emotion score.

DETAILED DESCRIPTION

The detailed description provided below in connection with the appended drawings is intended as a description of the present examples and is not intended to represent the only forms in which the present example may be constructed or utilized. However, the same or equivalent functions and sequences may be accomplished by different examples.

Figure 1:
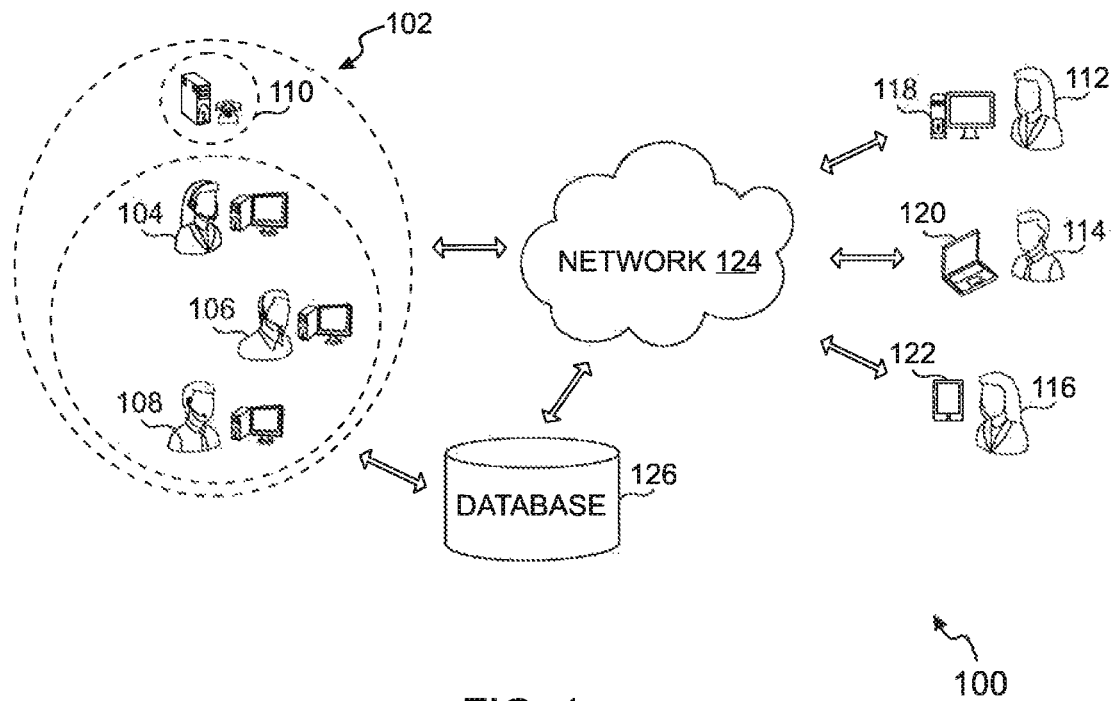
FIG. 1 is a diagram showing an example representation of a customer interaction environment, in accordance with an embodiment of the invention.

FIG. 1 is a diagram showing an example representation of a customer interaction environment 100, in accordance with an embodiment of the invention. The environment 100 depicts a simplified visual representation of a customer sales and service (CSS) center 102. The CSS center 102 includes a plurality of customer support representatives. For example, the CSS center 102 is depicted to include human agents, such as an agent 104, an agent 106 and an agent 108, and an interactive voice response (IVR) system 110. It is understood that the CSS center 102 is depicted to include three agents and the IVR system 110 for illustration purposes and that the CSS center 102 may include a plurality of such agents and/or IVR systems. Further it is noted that, in addition to human agents and the IVR system 110, the CSS center 102 may also include chat bots and/or self assist systems such as either web or mobile digital self-service systems. It is noted that the term 'customer support representatives' as used herein refers to human agents, chat bots, IVR systems, self assist systems, and, in general to any human or machine interface interacting with customers of enterprises.

Each agent is associated with an electronic device for interacting with existing/potential customers disposed at diverse geographical locations, such as for example, customers 112, 114 and 116. The plurality of agents 104, 106 and 108 are depicted to be associated with desktop computers in the interaction environment 100. It is understood that an agent may use any electronic device configured to facilitate interaction between two remote entities (for example, entities, such as the agent and an existing/potential customer). For example, the agent may be equipped with an telephone instrument configured to facilitate a voice call conversation between the agent and a customer.

Each customer may similarly be associated with one or more electronic devices for interacting with the plurality of agents and/or the IVR system 110. The customer 112 is depicted to be associated with a desktop computer 118, the customer 114 is depicted to be associated with a laptop 120 and the customer 116 is depicted to be associated with a tablet device 122. It is noted that the electronic devices, such as the desktop computer 118, the laptop 120 and the tablet device 122 are depicted herein for illustration purposes. Further, the interactions conducted using the electronic devices 118, 120, and 122 are depicted as single device and single interaction channel based interactions for illustration purposes only. It is noted that one or more customers from among the customers 112-116 may be associated with multiple electronic devices and may interact with the customer service representatives over multiple devices and/or using multiple interaction channels (such as a chat channel, a voice channel, an IVR channel and the like). Further, multiple device/channel based interactions between a customer and an agent may be executed concurrently or separately as per the customer's need.

It is understood that the customers and the customer support representatives may interact with each other for a variety of purposes. In an example scenario, a customer from among the plurality of customers 112, 114 and 116 may wish to interact with a customer support representative to inquire about a product or a service prior to making a purchase of the product or the service. In some exemplary scenarios, the customer may also wish to interact with the agent and/or the IVR system 110 after purchasing a product or a service (for example, to configure or troubleshoot the product, to enquire about upgrades, to enquire about billing or payment or shipping of the product/service, to provide feedback, to register a complaint, to follow up about a previous query and the like). It is noted that though the interactions (for example, online chat conversations or voice calls) mentioned herein refer to interactions initiated by the plurality of customers to the plurality of agents and/or the IVR system 110, however in some example scenarios, the plurality of agents and/or the IVR system 110 may proactively initiate interactions with the plurality of customers. For example, the plurality of agents may initiate the interactions for soliciting a purchase of a product/service, for responding to an earlier customer query or for requesting feedback related to a product/service offered on a website.

The interactions between the plurality of agents and/or the IVR system 110 and the plurality of customers may be performed over a communication network, such as a network 124. Examples of the network 124 may include wired networks, wireless networks or a combination thereof. Examples of wired networks may include Ethernet, local area network (LAN), fiber-optic cable network and the like. Examples of wireless network may include cellular networks like GSM/3G/4G/CDMA networks, wireless LAN, Bluetooth or Zigbee networks and the like. An example of a combination of wired and wireless networks may include the Internet.

In various example scenarios, data corresponding to interactions between the customers and the customer support representatives may be stored in a database, such as a database 126. In an embodiment, the interaction data, i.e. data corresponding to the interactions, may include conversational data such as for example data related to chats or voice call conversations, and/or journey data, such as options accessed during an IVR based interaction, and the like. In at least one example embodiment, the database 126 may be configured to store the interaction data in a textual format. For example, in case of voice conversations (for example, for voice call conversations or voice/video chat interactions) between a customer and an agent, the data corresponding to the interactions may be converted into textual format using automatic speech recognition (ASR) and statistical language modeling (SLM) techniques and stored in the database 126. In case of text-based chat conversations, the textual content corresponding to the chat conversations may be directly stored in the database as unstructured data, and/or may be stored as structured data derived from unstructured data. In an embodiment, the database 126 may be configured to receive the data corresponding to the interactions on an on-going basis, i.e. while the interaction is in progress, or subsequent to the completion of the interactions.

In various example scenarios, the customers and/or the agents may fill-up surveys outlining their experiences corresponding to the interactions. The data corresponding to the surveys may be stored in the database 126 along with respective interaction data. The data included in the surveys (also referred to herein as the survey data) is typically used for training supervised models used for predicting the level of service provisioned to the customer. In some example scenarios, the database 126 may also be configured to store scores such as customer satisfaction score or CSAT, net promoter score or NPS, customer effort score or CES and the like, which are received along with the survey data.

In some scenarios, a metric commonly referred to as a net experience score is predicted as a measure of quality of the customer experience afforded to the customer during the interaction. An apparatus for predicting customer net experience scores with improved accuracy for facilitating modeling of customer interaction experiences is explained with reference to FIG. 2.

Figure 2:
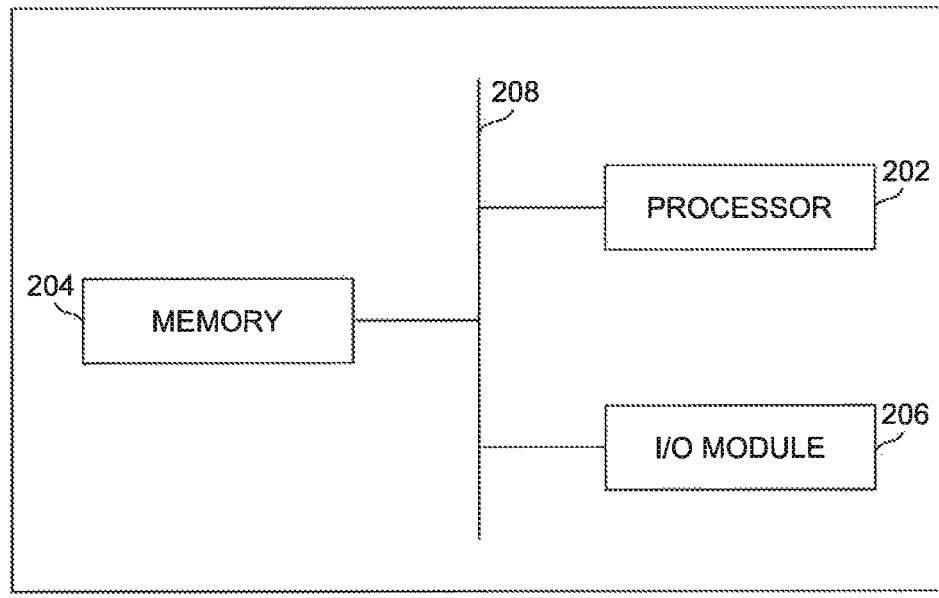
FIG. 2 is a block diagram showing an example apparatus configured to model customer interaction experiences, in accordance with an embodiment of the invention.

FIG. 2 is a block diagram showing an example apparatus 200 configured to model customer interaction experiences, in accordance with an embodiment of the invention. In an embodiment, the apparatus 200 may be deployed in a remote server/machine connected to a communication network (such as the network 124 explained with reference to FIG. 1) and capable of executing a set of instructions so as to model the customer interaction experiences. In at least one example embodiment, the apparatus 200 is an electronic system configured to receive and analyze interaction data, and to predict net experience scores fairly accurately to model the customer interaction experiences in an effective manner. The term 'customer' as mentioned herein and throughout the description refers to an existing or a potential user of products and/or services offered by an enterprise. Moreover, the term 'interaction' as mentioned herein may refer to any form of communication between a customer and a customer support representative/agent. For example, a customer interacting on phone or chatting using a chat application with an agent associated with the enterprise is illustrative of an interaction between the customer and the enterprise. It is also noted that the 'interaction' may be initiated by the customer or proactively initiated by an agent of the enterprise as explained with reference to FIG. 1. Further, the interactions may be related to resolving queries of the customer regarding sales or service, for advertising, for containing negative sentiments over social media, for addressing grievances of the customer, for escalation of customer service issues, for enquiring about upgrades, for enquiring about billing or payment or shipping of the product/service, for providing feedback, for requesting feedback, for registering a complaint or to follow up about a previous query and the like.

It is understood that enterprises and their customers may interact with each other on various interaction channels, such as for example, a web interaction channel, a chat interaction channel, a speech interaction channel, a social media interaction channel, a native mobile interaction channel, an interactive voice response (IVR) interaction channel and an in-person or a physical interaction channel, such as for example, a customer visit to an enterprise store or a retail outlet. In some embodiments, interactions between the enterprises and the customers may be conducted on two or more interaction channels simultaneously. For example, an agent of an enterprise may assist a customer to register on a website on the customer's tablet device by taking him through the various steps involved in the registration process over a phone call. In such a case, the interaction may be simultaneously conducted over the web interaction channel as well as the speech interaction channel. Moreover, in some example embodiments, interactions may be traversed from one interaction channel to another interaction channel.

The apparatus 200 includes at least one processor, such as a processor 202 and a memory 204. It is noted that though the apparatus 200 is depicted to include only one processor, the apparatus 200 may include more number of processors therein. In an embodiment, the memory 204 is capable of storing machine executable instructions. Further, the processor 202 is capable of executing the stored machine executable instructions. In an embodiment, the processor 202 may be embodied as a multi-core processor, a single core processor, or a combination of one or more multi-core processors and one or more single core processors. For example, the processor 202 may be embodied as one or more of various processing devices, such as a coprocessor, a microprocessor, a controller, a digital signal processor (DSP), a processing circuitry with or without an accompanying DSP, or various other processing devices including integrated circuits such as, for example, an application specific integrated circuit (ASIC), a field programmable gate array (FPGA), a microcontroller unit (MCU), a hardware accelerator, a special-purpose computer chip, or the like. In an embodiment, the processor 202 may be configured to execute hard-coded functionality. In an embodiment, the processor 202 is embodied as an executor of software instructions, wherein the instructions may specifically configure the processor 202 to perform the algorithms and/or operations described herein when the instructions are executed. The processor 202 may include, among other things, a clock, an arithmetic logic unit (ALU) and logic gates configured to support various operations of the processor 202.

The memory 204 may be embodied as one or more volatile memory devices, one or more non-volatile memory devices, and/or a combination of one or more volatile memory devices and non-volatile memory devices. For example, the memory 204 may be embodied as magnetic storage devices such as hard disk drives, floppy disks, magnetic tapes, etc., optical magnetic storage devices (e.g. magneto-optical disks), CD-ROM (compact disc read only memory), CD-R (compact disc recordable), CD-R/W (compact disc rewritable), DVD (Digital Versatile Disc), BD (Blu-ray® Disc), and semiconductor memories such as mask ROM, PROM (programmable ROM), EPROM (erasable PROM), flash ROM, RAM (random access memory), etc.

In an embodiment, the memory 204 is configured to store several multilingual resources or lexicons, for example, stop words for each of the different languages, list of positive, negative or neutral words in each of the different languages, list of words for each of several mood types in each of the different languages, semantic wordnets in each of the different languages, bilingual dictionaries for each unique language pairs, popular phrases and idioms for each of the different languages and the like.

The apparatus 200 also includes an input/output module 206 (hereinafter referred to as 'I/O module 206') for providing output and/or receiving input. The I/O module 206 is configured to be in communication with the processor 202 and the memory 204. Examples of the I/O module 206 include, but are not limited to, an input interface and/or an output interface. Examples of the input interface may include, but are not limited to, a keyboard, a mouse, a joystick, a keypad, a touch screen, soft keys, a microphone, and the like. Examples of the output interface may include, but are not limited to, a display such as a light emitting diode display, a thin-film transistor (TFT) display, a liquid crystal display, an active-matrix organic light-emitting diode (AMOLED) display, a microphone, a speaker, a ringer, a vibrator, and the like. In an example embodiment, the processor 202 may include I/O circuitry configured to control at least some functions of one or more elements of the I/O module 206, such as, for example, a speaker, a microphone, a display, and/or the like. The processor 202 and/or the I/O circuitry may be configured to control one or more functions of the one or more elements of the I/O module 206 through computer program instructions, for example, software and/or firmware, stored on a memory, for example, the memory 204, and/or the like, accessible to the processor 202.

In an embodiment, various components of the apparatus 200, such as the processor 202, the memory 204 and the I/O module 206 are configured to communicate with each other via or through a centralized circuit system 208. The centralized circuit system 208 may be various devices configured to, among other things, provide or enable communication between the components (202-206) of the apparatus 200. In certain embodiments, the centralized circuit system 208 may be a central printed circuit board (PCB) such as a motherboard, main board, system board, or logic board. The centralized circuit system 208 may also, or alternatively, include other printed circuit assemblies (PCAs) or communication channel media.

It is understood that the apparatus 200 as illustrated and hereinafter described is merely illustrative of an apparatus that could benefit from embodiments of the invention and, therefore, should not be taken to limit the scope of the invention. It is noted that the apparatus 200 may include fewer or more components than those depicted in FIG. 2. Moreover, the apparatus 200 may be implemented as a centralized apparatus, or, alternatively, the various components of the apparatus 200 may be deployed in a distributed manner while being operatively coupled to each other. In another embodiment, the apparatus 200 may be embodied as a mix of existing open systems, proprietary systems and third party systems. In another embodiment, the apparatus 200 may be implemented completely as a set of software layers on top of existing hardware systems. In an exemplary scenario, the apparatus 200 may be any machine capable of executing a set of instructions (sequential and/or otherwise) so as to model interaction experiences of the customers. In at least one example embodiment, an interaction experience of a customer is modeled based at least in part on a net experience score predicted corresponding to one or more interactions between the customer and customer support representative.

The modeling of interaction experiences is explained hereinafter with reference to one or more interactions between a customer and an agent. It is noted that the apparatus 200 may be caused to model interaction experiences of a plurality of customers as explained herein.

In at least one example embodiment, the I/O module 206 of the apparatus 200 is caused to receive interaction data corresponding to one or more interactions between a customer and an agent. In an embodiment, the I/O module 206 is configured to be communicably associated with a database, such as the database 126 of FIG. 1, and/or with a CSS center, such as the CSS center 102 explained with reference to FIG. 1. The I/O module 206 may receive the interaction data corresponding to one or more interactions between the customer and the agent from the database and/or the CSS center. In at least one embodiment, interaction data may include chat transcripts and/or text transcripts of voice conversations between the customer and the agent. In at least some embodiments, the I/O module 206 may also be communicably associated with customer touch points, such as mobile phones, tablet devices, personal computers and the like, so as to receive data related to customer interactions from native mobile applications or from speech conversations. It is understood that the I/O module 206, the electronic devices of the customers/agents and/or the IVR systems, such as the IVR system 110 of FIG. 1, may include requisite hardware, software and/or firmware (not shown in FIG. 2) for interacting with each other. In an embodiment, the I/O module 206 is configured to store the received interaction data in the memory 204.

In an embodiment, the I/O module 206 is further caused to receive information such as customer survey data, agent survey data, score information such as a customer satisfaction score (CSAT), net promoter score (NPS) score, customer effort score (CES) score and the like. Additionally, the I/O module 206 may also receive information related to various interaction related parameters, such as customer responsiveness, time spent during the interaction and the like. In an embodiment, the I/O module 206 may also store such received information in the memory 204.

In an example embodiment, the processor 202 in conjunction with the memory 204 causes the apparatus 200 to detect at least one language associated with the interaction data corresponding to one or more interactions between the customer and the agent. In some embodiments, the interaction data may include code-mixed content, i.e. the interaction data may include content in more than one language. Accordingly, the apparatus 200 is caused to detect one or more languages present in the interaction data. For example, consider a following customer statement to an agent: "Hi Amigo, by when can I have my shipment delivered? Gracias". In such an example scenario, the apparatus 200 may be caused to detect presence of an English language and a Spanish language in the customer statement.

In at least one example embodiment, the processor 202 in conjunction with the memory 204 causes the apparatus 200 to generate textual content in a plurality of languages corresponding to the interaction data by translating text corresponding to each detected language into two or more different languages. For example, if the apparatus 200 has detected, say an English language and a Spanish language in the interaction data, then the apparatus 200 is caused to translate text corresponding to the English language into, say four different languages, for example, German, French, Spanish and Italian. Further, the text corresponding to the Spanish language may be translated into English, German, French and Italian languages. Accordingly, the apparatus 200 may be caused to generate textual content corresponding to the interaction data in five languages (i.e. the four translated languages and the original detected language) including English, German, Spanish and French and Italian languages. It is noted that the text corresponding to each language may include, in addition to generic words and characters, various other elements, such as emoticons, expressive punctuations (such as for example "!!" or "?"), abbreviations, jargons and slangs. It is understood that such elements may either be retained as-is or appropriately modified during translation.

In at least one example embodiment, the processor 202 in conjunction with the memory 204 causes the apparatus 200 to subject the text corresponding to each language to preprocessing. In an illustrative example, the text corresponding to the each language may be parsed to generate a plurality of tokens, i.e. linguistic units such as words, word ngrams, character ngrams, punctuations, alphanumerics or numbers, collectively referred to as tokens. Further, a pre-processing of the plurality of tokens may be performed in order to normalize the content as well as correct any errors included in their respective content. The pre-processing of the text corresponding to each language is explained later with reference to FIG. 3.

Subsequent to pre-processing of the tokens, the apparatus 200 may be caused to configure a plurality of segmented text portions (for example, text strings and/or chunks of text) corresponding to each language. In at least one example embodiment, the apparatus 200 may determine an emotion score for one or more segmented text portions, such that at least one emotion score is determined for text corresponding to each language. In at least one embodiment, the apparatus 200 may be caused to perform a correction of each emotion score based on at least one of a semantic analysis, a sarcasm analysis, an experiential analysis and an engagement-based analysis of the text. The determination of emotion scores and their subsequent correction is explained later with reference to FIG. 3.

In at least one example embodiment, the processor 202 in conjunction with the memory 204 causes the apparatus 200 to determine an aggregate emotion score using the corrected emotion scores. For example, if upon translation of the interaction data, textual content corresponding to three languages (including the original detected language) is generated and one or more corrected emotion scores are determined for each of those languages, then the apparatus 200 may be caused to determine an aggregate emotion score by aggregating the emotion scores corresponding to the three languages. The determination of aggregate emotion score is explained later with reference to FIG. 4.

In at least one example embodiment, the processor 202 in conjunction with the memory 204 causes the apparatus 200 to predict a net experience score using the aggregate emotion score. As explained above, the memory 204 is configured to store information related to at least one of a customer satisfaction (CSAT) score, a net promoter score (NPS), customer survey data and agent survey data. In an embodiment, the apparatus 200 is caused to execute a supervised or an unsupervised classifier on the stored information and the aggregate emotion score to predict the net experience score corresponding to the one or more interactions.

In at least one example embodiment, the processor 202 in conjunction with the memory 204 causes the apparatus 200 to model an interaction experience of the customer based on the net experience score. The modeling of the interaction experience is further explained with reference to FIGS. 3 and 4.

Figure 3:
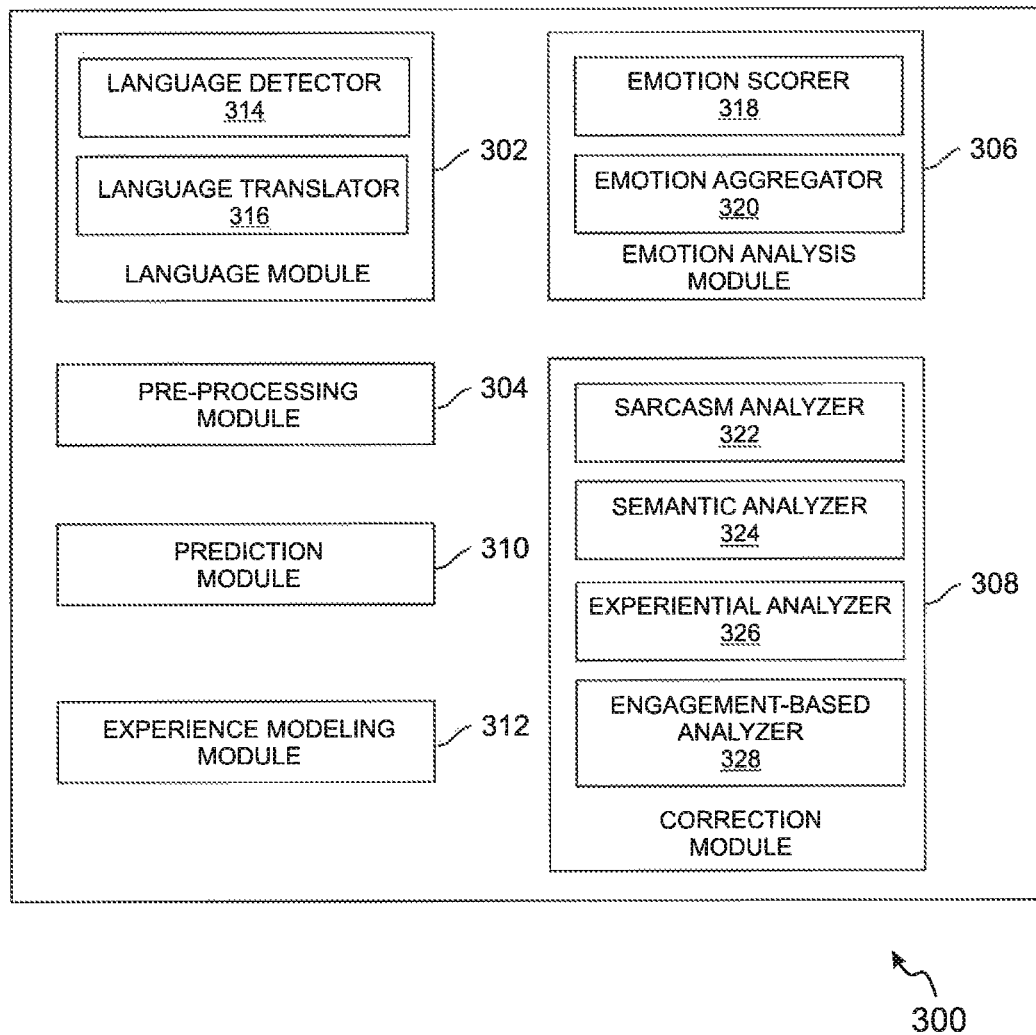
FIG. 3 is a block diagram depicting a plurality of modules associated with a processor of the apparatus of FIG. 2, in accordance with an embodiment of the invention.

FIG. 3 is a block diagram depicting a plurality of modules associated with the processor 202 of the apparatus 200 of FIG. 2, in accordance with an embodiment of the invention. More specifically, the processor 202 is depicted to include a language module 302, a pre-processing module 304, an emotion analysis module 306, a correction module 308, a prediction module 310 and an experience modeling module 312. The various components of the processor 202 such as the language module 302, the pre-processing module 304, the emotion analysis module 306, the correction module 308, the prediction module 310 and the experience modeling module 312 are communicably associated with each other. Further, the various components of the processor 202 may be implemented as hardware, software, firmware or any combination thereof. It is noted that the processor 202 may include fewer or more components than those depicted in FIG. 3.

In an embodiment, the language module 302 includes a language detector 314 and a language translator 316. As explained with reference to FIG. 2, the interaction data received by the I/O module 206 is stored in the memory 204. In at least one example embodiment, the language detector 314 is configured to extract the stored interaction data from the memory 204 and detect presence of one or more languages in the interaction data. In an embodiment, the language detector 314 is configured to compare whole text strings or portions of text in the interaction data with available language detection models for different languages, and predict the best matching language corresponding to the interaction data. In an embodiment, a language detector 314 detects a number of stop words such as "the", "a", and the like, in the interaction data and determines the language for that text string or substring based on the number of detected stop words of a particular language.

The language detector 314 is also configured to detect if the interaction data includes code-mixed content or not. For example the conversational line "yes, Monsieur" includes an English word "yes" and a French word "Monsieur". The language detector 314 compares the text associated with the interaction data that is code-mixed with available models for different languages, and provides the matching languages in form of a list citing the languages (for example, English and French) or a ranked list of probabilities citing the languages involved. In an embodiment, the language detector 314 is also configured to determine the one or more languages in which the interaction data is to be translated.

In at least one example embodiment, the language translator 316 is configured to translate each detected language into two or more different languages. The language translator 316 may be configured to utilize machine translation models included for each of the languages in addition to bilingual dictionaries for each unique pair of languages stored in the memory 204 for translation purposes. In one illustrative example, if German is one of the detected languages, then the corresponding text may be translated to two or more different languages, such as for example, into English, Spanish, Italian and French. The language translator 316 may also be configured to translate code-mixed text to a single language or multiple languages by using a plurality of machine translation modules. For example, the code-mixed text "yes, Monsieur" can be translated completely to English to read "yes, Sir". Alternatively, each detected language in the code-mixed text may be converted into two or more different languages to generate textual content corresponding to the interaction data.

In at least one embodiment, the text corresponding to each language is provided to the pre-processing module 304 for further processing purposes. In an embodiment, the pre-processing module 304 is configured to perform natural language processing (NLP) of the text corresponding to each language. The pre-processing module 304 includes a plurality of modules (not shown in FIG. 3), such as a tokenization module, a stop word removal module, a stemming module, a lemmatization module, a character/accent normalization module, a text normalization module, an emoticon normalization module and a segmentation module.

In an embodiment, the tokenization module is configured to parse input text (for example, text corresponding to the each language) into linguistic units such as words, word ngrams, character ngrams, punctuations, alphanumeric or numbers, collectively referred to as tokens for further processing. In an example embodiment, the input text is transformed into lists of tokens or a word list that is delimited by spaces, and token features (ie. features describing some properties of a sequence of characters that make up a token). The tokens that correspond to stop words (for example, words that do not improve the quality of the processing such as words like "the", "a", "is", and the like) are eliminated from this list of tokens by the stop word removal module. If the input text includes content corresponding to a segmented language, such as for example English language, then whitespaces and punctuations between words may be utilized to facilitate the tokenization process.

In an embodiment, the stemming module is configured to stem or truncate the tokens of the input text to form basic word forms also referred to as stems. More specifically, the process of stemming involves removal of the ends of words and/or aggregate standard forms of same word or synonym to reduce inflectional forms for the same family of related words, or to reduce the dimensionality of textual content being processed. The stemming also reduces complexity by mapping words that refer to a same basic concept to a single root. For example, words like family, families, families', and familial may be converted to 'family'. In an embodiment, the stemming module may or may not include re-normalization. For example, for words like "applying", "application", "applied", a non-normalized word stem may be "appl", while the re-normalized word may be a dictionary word like "apply". The stemming module may use stemming algorithms for stemming or truncating the tokens of the input text to form stems. Some non-exhaustive examples of stemming algorithms include Porter stemmer, Snowball stemmer, Lancaster stemmer modules and the like.

In at least one example embodiment, the lemmatization module helps in obtaining a single word (base word or lemma) for a bunch of related words. The lemmatization module may use context or part of speech tags for words for correctly normalizing words. In at least one example embodiment, the character/accent normalization module is configured to convert characters with diacritical marks, change different case letters, decompose ligatures and convert half-width katakana characters to full-width characters. In an illustrative example, a character 'ñ' in Spanish including a diacritical mark (or accent) '~' may be normalized to a character 'n' in English (by removing the diacritical mark) by the character/accent normalization module. In another illustrative example, a character 'Ö' in Swedish including a diacritical mark (or accent) '¨' is normalized to a character 'O' in English by the character/accent normalization module. Similarly, a word 'Café' may be processed by normalizing the uppercase and the diacritical mark therein to generate 'cafe' by the character/accent normalization module. An example of decomposing a ligature may involve converting a ligature '&' to 'et' in Latin or 'and' in English. In another example, a ligature 'æ' is decomposed to 'ae'. The character/accent normalization module is also configured to convert half-width katakana characters (Japanese characters that are tall and thin) to full-width characters (same Japanese characters that are of equal height and width).

In an embodiment, the text normalization module is configured to normalize or standardize several variants of features found in tokens/groups of tokens to a standard feature. In an embodiment, types of normalization may include and are not limited to word normalizations, lemmatizations, semantic normalizations, lexical normalizations and spelling corrections, acronym normalizations, phrase level or grammatical normalizations (for example, normalizing active and passive forms), and the like. In an embodiment, the text normalization module also incorporates a spell-checker configured to identify misspellings, grammatical errors, and the like. The spell-checker is further configured to not only correct the misspellings and the grammatical errors but also normalize words, semantics, lexicons, acronyms, abbreviations, and the like. For example, words "good", "gd" or "gooood" may be normalized to "good" and words like "I'll", "ill" "I will" may be normalized to "I will". In other illustrative example, misspellings like "kno" and "knuw" may be normalized to "know", and the like. Moreover, the text normalization module may also be configured to normalize acronyms, for example, "NY" may be normalized to "New York" or "gr8" may be normalized to "great", and the like.

In at least one example embodiment, the emoticon normalization module is configured to normalize emoticons in different languages to a standard set of emoticons. It is understood that the term 'emoticon' corresponds to a textual representation of a facial expression or an emotion of the customer. Some emoticons (also referred to as Western emoticons) need to be read or viewed by tilting the head to either side, for example as ':-)' indicating smiling or '<3' representing a heart, whereas other emoticons (also referred to as Eastern or Asian emoticons) can be read or viewed from left to right, for example (^ ~) can indicate winking or playfulness, while (o O) indicates surprise or confusion. Similarly, different languages have different styles of emoticons and customers can use such emoticons when conversing with the agents. The emoticon normalization module is configured to normalize the emoticons, for example emoticons of the form ':-)', ':)' and '(^_^)', all representing a smiling face, are normalized to ':)' by the emoticon normalization module. Similarly, the emoticon normalization module is configured to normalize the emoticons in different languages, for example a Japanese emoticon (^~^) representing a smiling face may be normalized to ':)'.

In an embodiment, the POS tagging module may be configured to assign part-of speech tags to the tokens. For example, a word or a token can be classified into one or more part-of speech categories, for example nouns, verbs, adjectives, and the like. A POS tag is a symbol representing such a category, for example NN may be a POS tag for a noun, VB may be a POS tag for a verb, and the like.

In an embodiment, the segmentation module includes at least one of a n-gram vectorizer, an n-gram tokenizer and a chunking module for facilitating further processing of the normalized data. The n-gram vectorizer is configured to vectorize or convert the tokens into numbers or numerical feature vectors (also referred to as indexing). For example, the tokens may be described by number of word occurrences, while the word ordering and grammar in the input text may not be taken into consideration. For example, in a sentence "To be or not to be", frequency of the word "to" is two, "be" is two, "or" is one and "not" is one. The n-gram vectorizer is configured to build a document with all the frequently occurring words which can be randomly accessed to enable simplification of further processing. The n-gram tokenizer is configured to generate segmented text portions, such as for example character level n-grams, word level n-grams, and the like. In an illustrative example, the sentence "To be or not to be" can be tokenized into word trigrams (3 words) such as "To be or", "be or not", "or not to", and "not to be". The chunking module is configured to divide the input text into phrases of phrase types such that syntactically related words become members of the same phrase. Examples of the phrase types are a noun phrase, a verb phrase, and the like. For each phrase type, a sequence of categories may be grouped into elementary syntactic structures or chunks. For example, noun phrase detection refers to the extraction of chunks around a noun, which helps in the detection of multi-word entities, for example "The White House".

In at least one embodiment, the pre-processing module 304 is configured to provide the segmented text portions corresponding to the text for each language to the emotion analysis module 306 for emotion scoring purposes. The emotion analysis module 306 includes an emotion scorer 318 and an emotion aggregator 320. In an embodiment, the emotion scorer 318 is configured to determine a emotion score for one or more segmented text portions. In an embodiment, an emotion score for a segmented text portion may be a sentiment or a mood label such as for example, anger, delight, frustration, and the like. In another embodiment, the sentiment or the mood label may be a 'positive sentiment', a 'negative sentiment' or a 'neutral sentiment'. In some embodiments, the emotion score may be a numerical value. For example, the emotion score may assume any value from '+1' to '−1'. In an embodiment, the emotion scorer 318 may determine the emotion score based on emotion type and/or emotion strength of the respective segmented text portion(s). In an embodiment, the emotion scorer 318 may use weights of features extracted from the segmented text portions by supervised, semi-supervised or unsupervised predictive models to determine appropriate scores. Non-exhaustive examples of the predictive models may include supervised or unsupervised algorithms such as k-means clustering, hierarchical clustering, support vector machines, K-nearest neighbor (KNN), naïve Bayesian, rule engines, neural networks, logistic regression, decision trees, random forest, ensemble models and the like.

In an embodiment, the emotion scorer 318 includes an emotion magnification module (not shown in FIG. 3). The emotion magnification module includes a weight adjustment module that is configured to adjust the weights for emotion of features based on a magnification signal. For example, emotion weight or strength is adjusted for word features based on number of character repetitions (for example, "gooooood" has a higher emotion strength than "good"), emotion weight for an emoticon is adjusted based on the number of repetitions of emoticons (for example, :-) :-) :-) has a higher strength than :-)), and the like. It is noted that though the text normalization module may normalize the text string during pre-processing of input text strings as explained earlier, information on a number of characters involved therein maybe retained, for example, for subsequent use by modules such as the emotion magnification module.

In an embodiment, the emotion scorer 318 is configured to determine at least one emotion score for the text corresponding to each language. The determination of the emotion score(s) may be performed based on the individual scores assigned to the tokens or groups of tokens. In an illustrative example, the emotion scorer 318 may identify the most frequent sentiment associated with the tokens associated with the text corresponding to a language and choose that sentiment as the emotion score. In another illustrative example, the emotion scorer 318 may perform any one of averaging, adding, weighted averaging of numerical values of the plurality of tokens or emotion tags to determine one or more emotion scores for the respective language.

In at least one embodiment, the emotion scores of the segmented text portions corresponding to the plurality of languages are provided to the correction module 308 for applying appropriate correction thereto. In an embodiment, the correction module 308 includes a sarcasm analyzer 322, a semantic analyzer 324, an experiential analyzer 326 and an engagement-based analyzer 328.

In an example embodiment, the sarcasm analyzer 322 is configured to detect presence of sarcasm in segmented text portions corresponding to each language and correct opinion from a negative/positive opinion to a positive/negative opinion. For example, some segmented text portions may include lines/textstrings such as "This device is just awesome" or "My phone has conked out again. Isn't this just great?", which are meant to be said in a sarcastic sense. In such a case, the sarcasm analyzer 322 detects the presence of sarcasm and provides a corrected emotion score to those text strings or segmented text portions.

In an embodiment, the semantic analyzer 324 is configured to determine semantic concepts (meaning of a language) and relationship of concepts within the segmented text portions. The segmented text portions may be semantically analyzed to extract classes, objects, and respective attributes, methods, and associations. In an embodiment, the semantic analyzer 324 is configured to initially perform, an extraction of the meanings of words from a corresponding dictionary, and then select the correct meaning of the word from multiple meanings of the word (also referred to as lexical disambiguation or word sense disambiguation). For example, the word "bat" can refer to a sporting good or an animal. The words in the segmented text portions serve as part of the context in which meanings of the other words are to be determined, and hence the semantic analyzer 324 can assign semantic markers to the words and further process the segmented text portions at sentence level. In an embodiment, the semantic analysis may also be configured to associate scores to portions of input text based on the analysis. In an example embodiment, the semantic analyzer 324 is configured to analyze semantics in the input text and correct semantic similarity in one or any combination of the different languages and thereby facilitate in correction of corresponding scores. For example, a segmented text portion may include a textstring "It is a quite day" which includes a semantic error "quite". The semantic analyzer 324 detects the misplacement of the similar words "quite" and "quiet" and corrects the word usage to "quiet" as per the context of the sentence.

In an embodiment, the experiential analyzer 326 is configured to facilitate correction of scores based on heuristics or business rules. For example, a rule may be defined to correct lines like "no sorry, that is all I wanted", from a negative sentiment score (as the negative word "no" is detected) to a neutral sentiment score. In another illustrated example, a business rule can be defined to correct lines such as "Why doesn't your bank do this. Bank B (for example, a competing bank) does this very well", from a positive sentiment score (as the positive word 'very well' is detected) to a negative sentiment score. More complex business rules may also be created based on weightages given to the agent or the customer from historic interactions.

In an example embodiment, the engagement-based analyzer 328 is configured to account for the structure of text interaction or voice conversation, represented by a set of structured interaction variables logged directly, or derived from unstructured data that are likely to impact the overall customer experience during the interaction. Some non-exhaustive examples of structured interaction variables may include counts of the number of agreements by agent or customer, number of deferment states by agent or customer, number of disagreement states by agent or customer, number of information states by agent, customer, number of action states by agent or customer, number of cross-questions, no.

of cross-sells or upsells attempted by agent during the interaction, and the like. In some embodiments, the correction module 308 also provides correction for conversational patterns to enhance interaction between the customer and the agent.

The emotion scores corrected by various modules of the correction module 308 are presented to the emotion aggregator 320. As explained with reference to FIG. 2, in at least one example embodiment, the apparatus 200 is caused to determine an aggregate emotion score by using the corrected emotion scores for the text corresponding to the each language. More specifically, the emotion aggregator 320 is configured to receive the corrected emotion scores for each language and thereafter compute an aggregate emotion score corresponding to the interaction data. In an embodiment, the emotion aggregation may be performed based on averaging (using weights or otherwise) or selecting minimum or maximum for each feature or semantic class of features. More specifically, the aggregate emotion score may be determined by performing one of averaging or weighted averaging of the corrected emotion scores for the text corresponding to the each language, or, by selecting a highest or a lowest emotion score from among the corrected emotion scores for the text corresponding to the each language as the aggregate emotion score. In an embodiment, the emotion aggregation may be performed at any of the substring level, whole text, unigrams, bigrams, trigrams, n-grams, POS tag based chunks, semantic classes, and the like.

In an embodiment, the prediction module 310 is configured to receive the aggregate emotion score and other interaction related information such as CSAT score, the NPS score, the CES score, and the survey data (based on explicit customer feedback from customer surveys for which corresponding interaction text or speech history may be mapped), structured and unstructured chat interaction data. In an embodiment, the prediction module 310 is configured to execute a supervised or an unsupervised classification on top of the aggregated score and other received interaction data to predict the net experience score. For example, the supervised or unsupervised classification may involve use of algorithms such as, but not limited to, K-nearest neighbor (KNN), naïve Bayesian, rule engines, neural networks, logistic regression, decision trees, random forest, ensemble models, and the like. Such a prediction of net experience scores is associated with higher accuracy as it involves mining of varied emotions in unstructured data, which provide fair reflection of the experience afforded to the customers. Moreover, the mining of emotions is performed for multi-lingual unstructured data.

In an embodiment, the predicted net experience score may be embodied as a mood (for example, an overall mood corresponding to the one or more interactions or an interim mood of the customer during an on-going interaction). For example, the predicted net experience score may reflect the customer to be delighted, angry, frustrated and the like. In an embodiment, the predicted net experience score may be embodied as a numerical value. For example, the predicted net experience score may assume a value between '+1' or '−1' corresponding to predicted customer sentiment. In an embodiment, the prediction module 310 is configured to provide the predicted net experience score to the experience modeling module 312.

In at least one embodiment, the experience modeling module 312 is configured to receive the predicted net experience score and develop an appropriate model of the interaction experience of the customer. In the simplest form, the model of the interaction experience may relate one or more customer/agent actions leading to the interaction or the actions during the interaction to the experience afforded to the customer. More specifically, the model of customer interaction experience may provide an insight into 'why' a customer is experiencing a particular sentiment and also provide recommendations to improve the customer interaction experience.

For example, the recommendations suggested by the modeled interaction experience for the customer may include, but are not limited to, recommending upsell/cross-sell products to the customer, suggesting products to upsell/cross-sell to agent as a recommendation, offering a suggestion for a discount to the agent as a recommendation, recommending a style of conversation to the agent during an interaction, presenting a different set of productivity or visual widgets to the agent to facilitate personalization of interaction with specific persona types on the agent interaction platform, presenting a different set of productivity or visual widgets to the customers with specific persona types on the customer interaction platform, proactive interaction, customizing the speed of interaction, customizing the speed of servicing information and the like.

In some example scenarios, the modeled interaction experience may recommend routing the customer's interaction to the queue with the least waiting time or to the most suitable agent based on an agent persona type or a skill level associated with the agent. In another example embodiment, the recommendations may include offering discounts or promotional offers to the customer. In another example scenario, the recommendations for offering suitable real-time, online or offline campaigns to a customer segment may also be suggested. In at least one example embodiment, the apparatus 200 is caused to provide personalized interaction experience to the customer based on the one or more recommendations. An example process flow for developing an model of interaction experience of the customer is depicted in FIG. 4.

Figure 4:
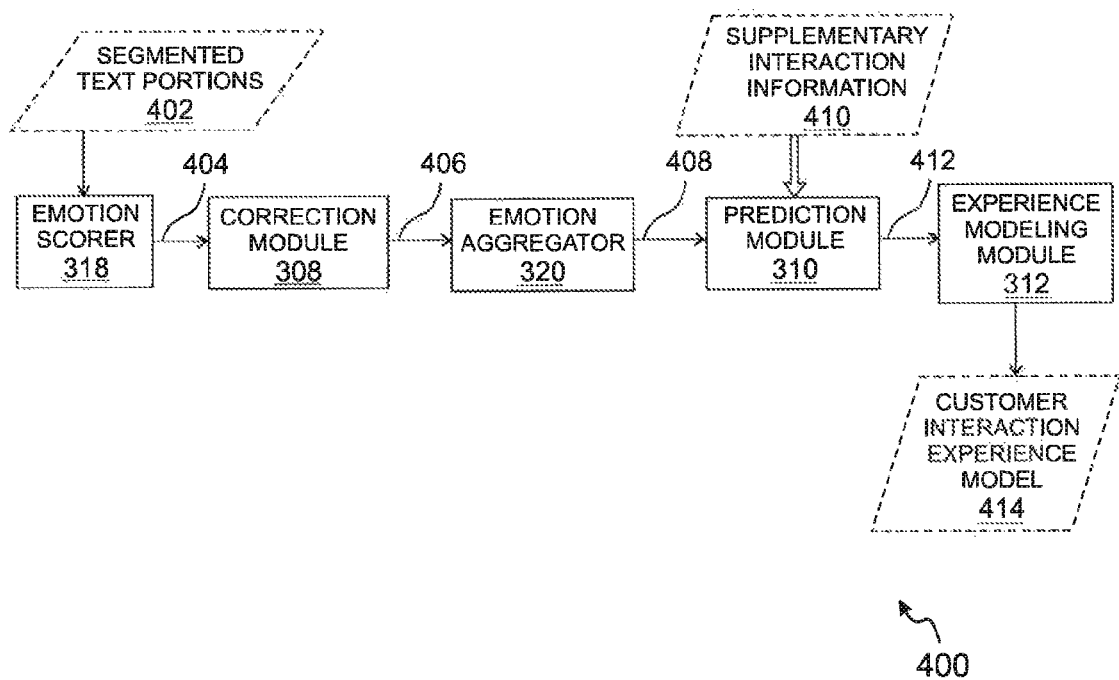
FIG. 4 is a diagram showing an example process flow executed by the apparatus of FIG. 2 for generating a model of the customer's interaction experiences from emotion scores computed from text corresponding to each language, in accordance with an embodiment of the invention.

FIG. 4 is a diagram showing an example process flow 400 executed by an apparatus, such as the apparatus 200, for generating a model of the customer interaction experience from emotion scores computed from text corresponding to each language, in accordance with an embodiment of the invention. As explained with reference to FIGS. 2 and 3, one or more languages are detected in the interaction data corresponding to the interactions between the customer and the agent and the corresponding text is translated into several different languages to generate multi-lingual text (including text corresponding to the originally detected language). Further, the multi-lingual text is pre-processed and segmented to generated segmented text portions. The segmented text portions are then provided to the emotion scorer 318 in the emotion analysis module 306 as explained in FIG. 3.

The process flow 400 depicts an example process followed after the segmented text portions, such as segmented text portions 402, for each language are provided to the emotion scorer 318. The emotion scorer 318 is configured to determine emotion scores 404 for the segmented text portions 402 and provide the emotion scores 404 to the correction module 308. The correction module 308 analyzes and corrects the emotion scores 404 and provides the corrected emotion scores 406 to the emotion aggregator 320. The emotion aggregator 320 determines an aggregate emotion score 408 corresponding to the interaction data using the various emotion scores. The aggregate emotion score 408 is provided to the prediction module 310. The prediction module 310 is also configured to receive other supplementary interaction information 410 such as other scores (CSAT, NPS, CES and the like), survey data and structured and unstructured variables from the memory 204 of FIG. 2. The prediction module 310 is configured to execute a supervised or an unsupervised classification algorithm on the received aggregate emotion score 408 and the supplementary interaction information 410 to predict a net experience score 412. The prediction module 310 may be configured to provision the net experience score 412 to the experience modeling module 312, which stores a plurality of customer models therein. The experience modeling module 312 is configured to model an interaction experience of the customer based on the predicted net experience score 412 to generate a customer interaction experience model 414. The modeling of interaction experience is further explained with reference to an illustrative example in FIG. 5.

Figure 5:
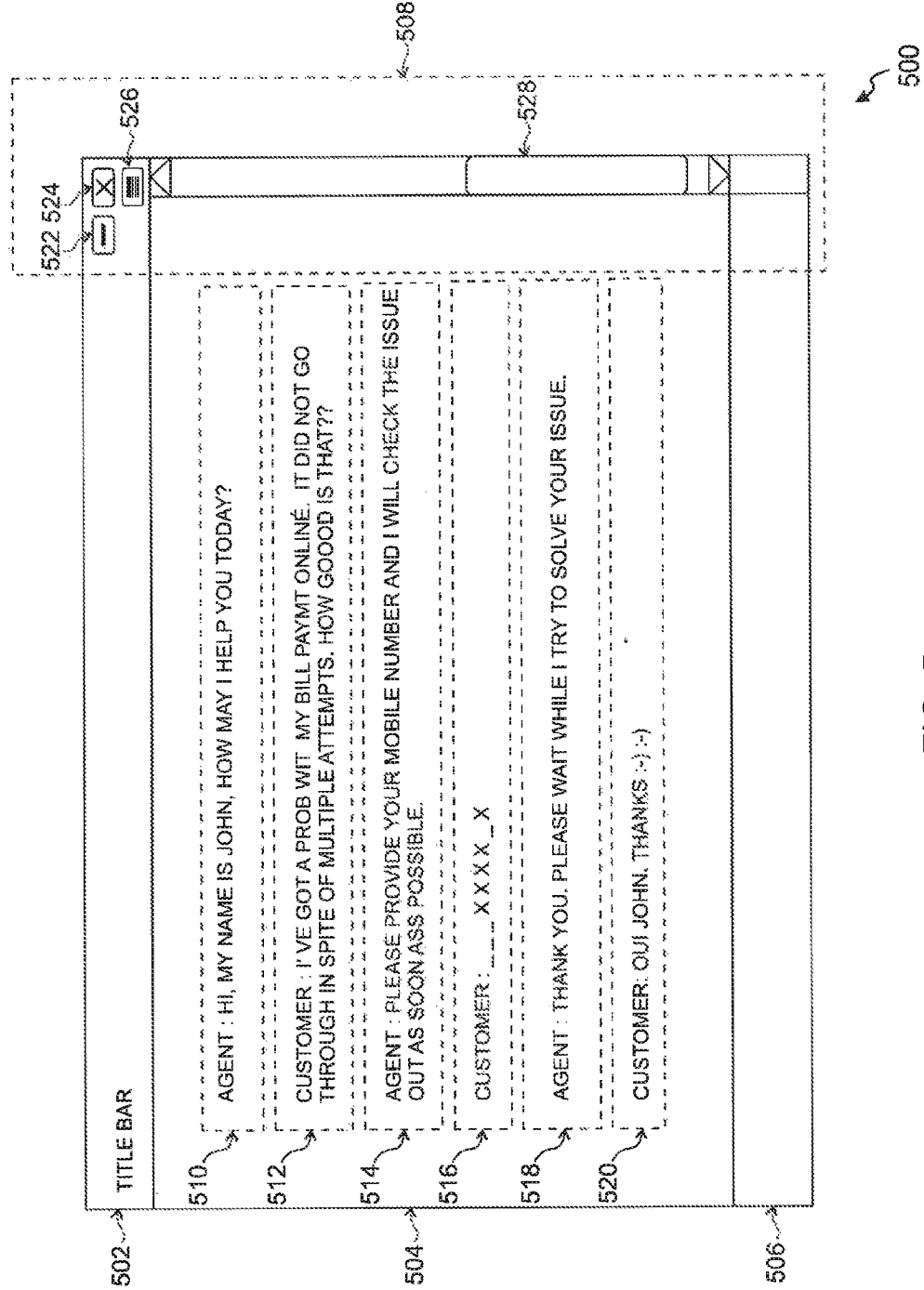
FIG. 5 depicts a screenshot of a chat console for illustrating an example chat conversation between an agent and a customer, in accordance with an embodiment of the invention.

FIG. 5 depicts a screenshot of a chat console 500 for illustrating an example chat conversation between an agent and a customer in accordance with an embodiment. It is noted that the modeling of interaction experience for the customer is explained herein with reference to interaction data received corresponding to the chat conversation between a customer and an agent for illustration purposes. However, it is understood that speech-to-text transcripts of voice call conversations may also be subjected to such prediction of customer net experience scores and modeling of interaction experiences. Moreover, it is understood that the apparatus 200 may be configured to perform appropriate modifications for modeling interaction experiences of customers involved in voice call conversations. Furthermore, the modeling of interaction experiences may also be performed in a similar manner for textual interaction data received corresponding to chat conversations between the customer and a chatbot or speech-to-text transcript of a customer's conversation with an IVR system, such as the IVR system 110 explained with reference to FIG. 1.

In an embodiment, the chat console 500 may correspond to a chat application on an electronic device associated with the agent. The chat console 500 is depicted to include a title bar 502, a chat history display section 504, a text input section 506, and a user control section 508. The title bar 502 may be configured to display information such as for example, a name of a customer involved in interacting with the agent, a customer IDS, an agent name, an agent identification number and the like. The chat history display section 504 is configured to display history of interaction between the customer and the agent in an on-going manner in real-time. The text input section 506 is configured to enable the agent to type in text. The chat text typed by the agent is displayed next to the agent's name, as exemplarily illustrated in dotted blocks 510, 514 and 518 in the chat history display section 504. The chat text typed by the customer is displayed next to the customer's name, as exemplarily illustrated in dotted blocks 512, 516 and 520 in the chat history display section 504. It is understood that the agent's name and the customer's name are depicted as "Agent" and "Customer" respectively in the chat console 500 for illustration purposes only.

The user control section 508 is depicted to include a plurality of buttons corresponding to a plurality of options for controlling the chat console 500. More specifically, the user control section 508 is depicted to include a minimize button 522, a close button 524, a drop-down list button 526, and a scroll button 528. It is understood that the order/placement of the buttons 522, 524, 526 and 528 are presented herein for illustration purposes and that the order may vary in some embodiments. The minimize button 522 and the close button 524 are used to minimize the chat console 500 and close the chat console 500, respectively. The drop-down list button 526 is configured to provide a list of menu-options (such as for example, options related to chat settings) to the agent. The scroll button 528 is configured to enable the agent to scroll up or down the chat history in the chat history display section 504.

In an exemplary scenario, the agent types in a salutation to the customer such as "Hi, my name is John, how may I help you today?" as depicted in a dotted block 510 in the chat history display section 504. In return, the customer types an input text that reads "I've got a prob wit my bill paymt onliné. It did not go through in spite of multiple attempts. How goood is that??", as illustrated in dotted block 512. The dotted blocks 514, 516, 518 and 520 similarly depict agent and customer responses in the chat history display section 504. The data corresponding to the chat interaction may be received by the apparatus 200 in substantially real-time on an on-going basis, or in some embodiments, may be received upon completion of the chat interaction. As explained with reference to FIGS. 2 and 3, the various modules of the apparatus 200 may process the interaction data corresponding to the chat interaction to predict the net experience score corresponding to the interaction.

In an embodiment, the apparatus 200 is configured to detect one or more languages associated with the interaction data. For example, the language detector 314 may detect the language of the interaction data to be English based on the input text included in dotted blocks 510 to 518, and is determined to be code-mixed with two languages, English and French, in the input text depicted in the dotted block 520. Upon determination of the language associated with the input text, the language detector 314 is configured to determine the number of language translations that are to be performed. For example, the language detector 314 may determine that the text in English be converted to German and Spanish. The language translator 316 may perform the requisite translation of text into German and Spanish. Similarly, the code-mixed text "Oui John" in the input text depicted in dotted block 520 may be first translated from French to English to read "Yes John" and then to the German and Spanish languages. The textual content corresponding to interaction data in English, German and Spanish languages may be made available for further processing.

As explained with reference to FIGS. 2 and 3, the text corresponding to each language (also referred to herein as input text) may be subjected to pre-processing, for example, by using the pre-processing module 304. Accordingly, the tokenization module may tokenize the input text of the customer into tokens that include words, punctuations, alphanumeric or number. For example, the first portion of the input text in the dotted block 512 may be tokenized as "I" "'" "ve" "got" "prob" "wit" "my bill paymt" "online" ".". The stemming module may stem or truncate the tokens of the input text of the customer to basic word forms. The character/accent normalization module may normalize one or more characters in the input text, for example, for example the word "onliné" including a diacritical mark may be normalized to "online". The text normalization module may normalize several variants of features found in the input text to a standard feature. For example, the word "I've" in the input text of the input text may be normalized to "I have", the word "goood" may be normalized to "good", the word "prob" may be normalized to "problem" and the misspelled words "wit" and "paymt" may be normalized to "with" and "payment", respectively. The text normalization module may also be configured to normalize emoticons in the input text, to a standard set of emoticons. For example, emoticons :-):-) depicted in the dotted block 520 may be normalized to :). The various modules in the segmentation module may be configured to perform further processing of the data as explained with reference to FIG. 3. For example, the n-gram vectorizer may be configured to convert the input text into numbers or numerical feature vectors; the ngram tokenizer may be configured to tokenize the input text to segmented text portions; the POS tagging module may be configured to assign part-of speech tags to the words in the input text and the chunking module may be configured to chunk syntactically related words. The segmented data may be further be subjected to emotion analysis, for example, by using the emotional analysis module 306 of FIG. 3

Further, as explained with reference to FIG. 3, the emotion scorer 318 in the emotion analysis module 306 is configured to extract features from the input text in each translated language and analyze the features using algorithms to determine emotion scores. The emotion scores are further corrected in the correction module 308.

The correction module 308 is configured to correct the emotion scores received from the emotion scorer 318. For example, the semantic analyzer 324 in the correction module 308 is configured to perform semantic analysis of the segmented text portions to determine meaning of a language and relationship of concepts within the segmented text portions for each of the different languages. For example, the word "bill" in the input text in the dotted block 512 can refer to an itemized statement of money owed or paper money among other meanings. In other illustrative example, the input text included in the dotted block 512 includes words such as "How goood is that??" suggesting that the customer was unsatisfied with the online bill payment option. The sarcasm analyzer 322 in the correction module 308 detects the presence of sarcasm and identifies the associated sentiment as a negative sentiment as opposed to a positive sentiment. The correction module 308 disambiguates the emotion score based on the identified negative sentiment.

Further, the emotion score is adjusted for word features based on number of character repetitions (for example, "goood" has a higher emotion score than "good"). Similarly, emotion score for an emoticon is adjusted based on the number of repetitions of emoticons (for example, :-):-):-)) has a higher score than :-):-)).

The correction module 308 accordingly generates corrected scores, which then are provided to the emotion aggregator 320. The emotion aggregator 320 is configured to aggregate the corrected emotion scores for m-different languages received from the correction module 308 to generate an aggregate emotion score, which is stored in the memory 204 along with the CSAT score, the NPS score, the CES score, and the survey data. The generation of the aggregate emotion score is performed as explained with reference to FIG. 4 and is not explained again herein.

The prediction module 310 is configured to predict a net experience score corresponding to the interaction data by applying a supervised or an unsupervised classifier on top of a combination of the aggregate emotion score, the CSAT score, the NPS score, the CES score, and the survey data. Further, the experience modeling module 312 is configured to model the interaction experience of the customer based on the predicted net experience score. In some embodiments, based on the modeled interaction experience, an agent can be updated, as the chat conversation progresses in real-time, in order to enhance or improve a quality of experience afforded to the customer. A method for modeling customer interaction experience is explained with reference to FIG. 6.

Figure 6:
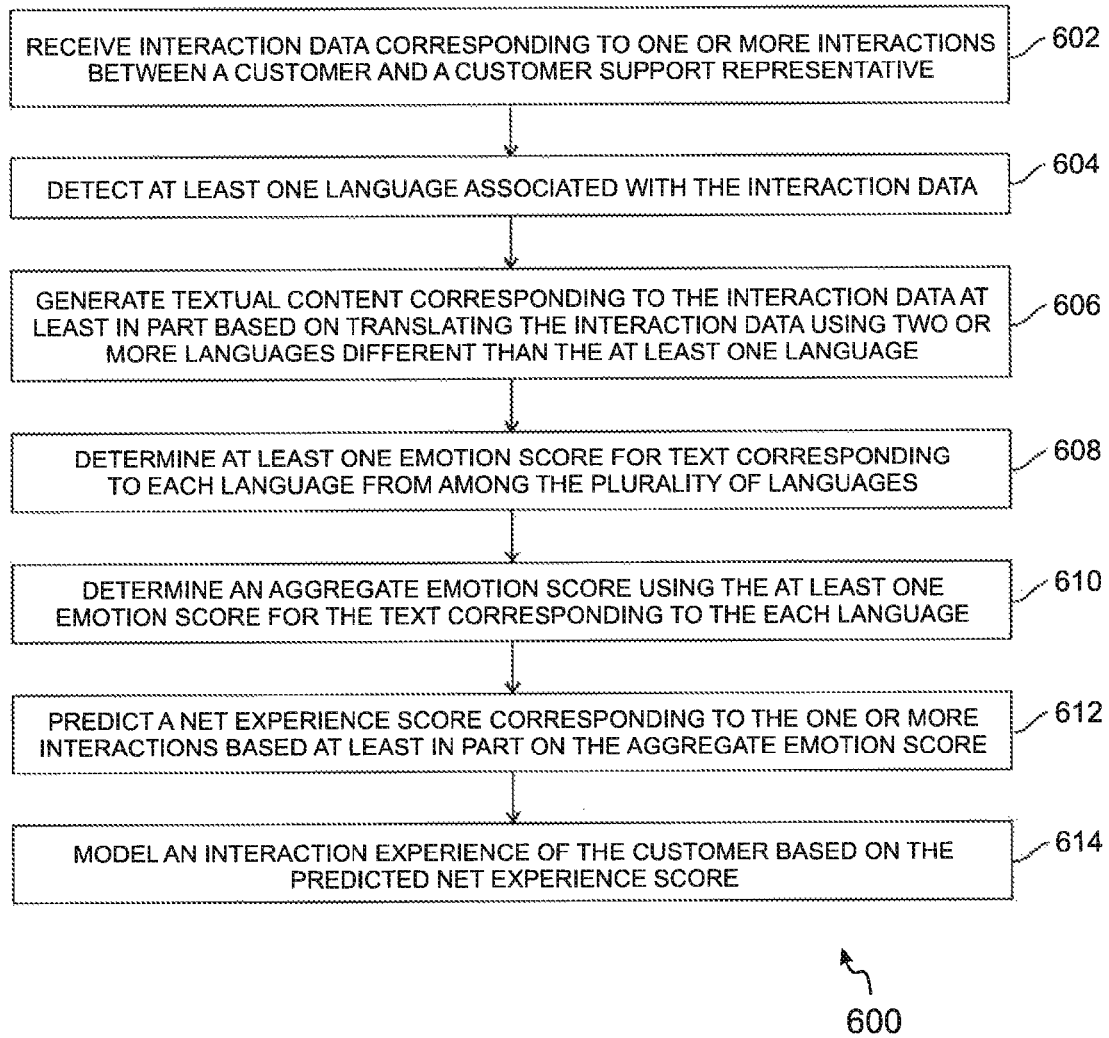
FIG. 6 illustrates a flow diagram of an example method for modeling a customer interaction experience, in accordance with an embodiment of the invention.

FIG. 6 illustrates a flow diagram of an example method 600 for modeling customer interaction experience, in accordance with an embodiment of the invention. The method 600 depicted in the flow diagram may be executed by, for example, the apparatus 200 explained with reference to FIGS. 2 to 5. Operations of the flowchart, and combinations of operation in the flowchart, may be implemented by, for example, hardware, firmware, a processor, circuitry and/or a different device associated with the execution of software that includes one or more computer program instructions. The operations of the method 600 are described herein with help of the apparatus 200. For example, one or more operations corresponding to the method 600 may be executed by a processor, such as the processor 202 of the apparatus 200. It is noted that though the one or more operations are explained herein to be executed by the processor alone, it is understood that the processor is associated with a memory, such as the memory 204 of the apparatus 200, which is configured to store machine executable instructions for facilitating the execution of the one or more operations. It is also noted that, the operations of the method 600 can be described and/or practiced by using an apparatus other than the apparatus 200. The method 600 starts at operation 602.

At operation 602 of the method 600, interaction data corresponding to one or more interactions between a customer and a customer support representative are received. The interaction data may include textual data related to chat conversations between the customer and the customer support representative, or, speech-to-text transcripts of voice conversations between the customer and the customer support representative and non-interaction data (for example, survey data in the form of textual content that is collected from the customer and the agent) associated with the customer and an agent.

At operation 604 of the method 600, at least one language associated with the interaction data is detected. At operation 606 of the method 600, textual content in a plurality of languages corresponding to the interaction data is generated at least in part based on translating the interaction data into two or more languages different than the detected language(s). The generation of the interaction data in the plurality of languages may be performed as explained with reference to FIGS. 2 and 3.

At operation 608 of the method 600, at least one emotion score is determined for text corresponding to each language from among the plurality of languages. In at least one example embodiment, prior to emotion scoring, the translated data (also referred to herein as input text) is pre-processed (for example, by the pre-processing module 304 explained with reference to FIG. 3) by performing at least one of normalization and segmentation of the textual content corresponding to the data. The pre-processing of the input text is performed by one or more normalization modules, for example the tokenization module, the stop word removal module, the stemming module, the lemmatization module, the character/accent normalization module and the text normalization module as explained with reference to FIG. 3 and are not explained herein for sake of brevity. Further, the input text is segmented to generate segmented text portions. In an embodiment, emotion scores are then generated and corrected for the segmented text portions, as explained with reference to FIGS. 2 and 3.

At operation 610 of the method 600, an aggregate emotion score is determined using the emotion scores for the text corresponding to the each language. At operation 612 of the method 600, a net experience score corresponding to the one or more interactions is predicted based at least in part on the aggregate emotion score. More specifically, a supervised or an unsupervised classifier is executed on top of the aggregated emotion score, the CSAT score, the NPS score, and the survey data (based on explicit customer feedback from customer surveys for which corresponding interaction text or speech history may be mapped) to predict the net experience score. The classification algorithm may be any one of, but not limited to, support vector machines (SVM), K-nearest neighbor (KNN), naïve Bayesian, rule engines, neural networks, logistic regression, decision trees, random forest, ensemble models, and the like. The predicted net experience score facilitates modeling customer experiences. At operation 614 of the method 600, an interaction experience of the customer is modeled based on the predicted net experience score. The modeling of the customer's interaction experience may be performed as explained with reference to FIG. 3 and is not explained herein.

Without in any way limiting the scope, interpretation, or application of the claims appearing below, advantages of one or more of the exemplary embodiments disclosed herein include an improved prediction of net experience score for a more effective modeling of customer interaction experiences. Effective modeling of customer interaction experience may assist in enhancing a customer service experience, thereby contributing to increased attributable revenue, increased resolution rates, increased efficiency, decreased cost of service and cost of sales, increased loyalty and retention, deepened relationship and increased life time value. The techniques disclosed herein suggest multi-lingual emotion analysis of interaction data based on mining of unstructured and structured data for an improved prediction of net experience score. Moreover, the multi-lingual emotion analysis involves emotion score aggregation/averaging over multiple language translations. Additionally, the emotion scores are corrected based on a variety of factors including those like text/conversational patterns, business heuristics, explicit customer survey feedback and the like. Such multi-lingual analysis of the input text may be performed to account for differences in strengths/connotations associated with words in different languages. For example, a word considered to less polar in English may be highly polar when translated into French. Moreover, different languages have different lexicons for positive, negative and neutral sentiments, various emoticons, mood types, acronyms, and the like. The results may then be normalized (for example, weighted average of the results may be performed) to accurately process the input text and thereby predict the net experience score more accurately. Further, the current approach is configured to consider a range of complex emotions, such as for example, emotions like anger, sarcasm, frustration, delight, humor and the like, while predicting NES. Moreover, the current approach has superior capabilities to handle code mixing in multiple languages.

Although the present technology has been described with reference to specific exemplary embodiments, it is noted that various modifications and changes may be made to these embodiments without departing from the broad spirit and scope of the present technology. For example, the various operations, blocks, etc., described herein may be enabled and operated using hardware circuitry (for example, complementary metal oxide semiconductor (CMOS) based logic circuitry), firmware, software and/or any combination of hardware, firmware, and/or software (for example, embodied in a machine-readable medium). For example, the apparatuses and methods may be embodied using transistors, logic gates, and electrical circuits (for example, application specific integrated circuit (ASIC) circuitry and/or in Digital Signal Processor (DSP) circuitry).

Particularly, the apparatus 200, the processor 202 and the memory 204 may be enabled using software and/or using transistors, logic gates, and electrical circuits (for example, integrated circuit circuitry such as ASIC circuitry). Various embodiments of the present technology may include one or more computer programs stored or otherwise embodied on a computer-readable medium, wherein the computer programs are configured to cause a processor or computer to perform one or more operations (for example, operations explained herein with reference to FIG. 6). A computer-readable medium storing, embodying, or encoded with a computer program, or similar language, may be embodied as a tangible data storage device storing one or more software programs that are configured to cause a processor or computer to perform one or more operations. Such operations may be, for example, any of the steps or operations described herein. In some embodiments, the computer programs may be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), CD-ROM (compact disc read only memory), CD-R (compact disc recordable), CD-R/W (compact disc rewritable), DVD (Digital Versatile Disc), BD (Blu-ray (registered trademark) Disc), and semiconductor memories (such as mask ROM, PROM (programmable ROM), EPROM (erasable PROM), flash ROM, RAM (random access memory), etc.). Additionally, a tangible data storage device may be embodied as one or more volatile memory devices, one or more non-volatile memory devices, and/or a combination of one or more volatile memory devices and non-volatile memory devices. In some embodiments, the computer programs may be provided to a computer using any type of transitory computer readable media. Examples of transitory computer readable media include electric signals, optical signals, and electromagnetic waves. Transitory computer readable media can provide the program to a computer via a wired communication line (e.g. electric wires, and optical fibers) or a wireless communication line.

Various embodiments of the present disclosure, as discussed above, may be practiced with steps and/or operations in a different order, and/or with hardware elements in configurations which are different than those which are disclosed. Therefore, although the technology has been described based upon these exemplary embodiments, it is noted that certain modifications, variations, and alternative constructions may be apparent and well within the spirit and scope of the technology.

Although various exemplary embodiments of the present technology are described herein in a language specific to structural features and/or methodological acts, the subject matter defined in the appended claims is not necessarily limited to the specific features or acts described above. Rather, the specific features and acts described above are disclosed as exemplary forms of implementing the claims.

The invention claimed is:

1. A computer-implemented method, comprising:
receiving, by a processor, interaction data corresponding to one or more interactions between a customer and a customer support representative and storing said interaction data in a memory;
extracting the stored interaction data from the memory and detecting, by the processor, the presence of at least one language associated with the interaction data by comparing whole text strings or portions of text in the interaction data with available language detection models for different languages, and predicting a best matching language corresponding to the interaction data;
generating, by the processor, textual content in a plurality of languages corresponding to the interaction data based at least in part on translating the interaction data using two or more languages different than the at least one language;
determining, by the processor, at least one emotion score for text corresponding to each language from among the plurality of languages;
determining, by the processor, an aggregate emotion score using the at least one emotion score for the text corresponding to the each language;
modeling, by the processor, an interaction experience of the customer based at least in part on the aggregate emotion score; and
providing at least one recommendation to the customer based on said modeled interaction experience.

2. The method of claim 1, further comprising:
predicting, by the processor, a net experience score corresponding to the one or more interactions based on the aggregate emotion score, wherein the predicted net experience score is configured to facilitate the modeling of the interaction experience of the customer.

3. The method of claim 2, further comprising:
receiving, by the processor, information comprising at least one of a customer satisfaction (CSAT) score, a net promoter score (NPS), customer survey data and agent survey data; and
executing, by the processor, a supervised or an unsupervised classifier on the received information and the aggregate emotion score to predict the net experience score corresponding to the one or more interactions.

4. The method of claim 1, wherein the interaction data comprises textual data corresponding to at least one of one or more text-based interactions and one or more voice-based interactions between the customer and the customer support representative.

5. The method of claim 1, wherein at least one interaction from among the one or more interactions comprises code-mixed content.

6. The method of claim 1, further comprising:
parsing the text corresponding to the each language to generate a plurality of tokens;
performing pre-processing of the plurality of tokens based at least in part on normalization and error correction of at least one token from among the plurality of tokens;
configuring a plurality of segmented text portions corresponding to the each language upon the pre-processing of the plurality of tokens; and
determining an emotion score for at least one segmented text portion from among the plurality of segmented text portions,
wherein determining the emotion score for the at least one segmented text portion facilitates the determination of the at least one emotion score for the text corresponding to the each language.

7. The method of claim 1, further comprising:
performing, by the processor, correction of the at least one emotion score based on at least one of a semantic analysis, a sarcasm analysis, an experiential analysis, and an engagement-based analysis of the text.

8. The method of claim 1, wherein the aggregate emotion score is determined by performing one of averaging or weighted averaging of the at least one emotion score.

9. The method of claim 1, wherein the aggregate emotion score is determined to be one of a highest emotion score or a lowest emotion score from among the at least one emotion score.

10. An apparatus, comprising:
at least one processor; and
a memory having stored therein machine executable instructions, that when executed by the at least one processor, cause the apparatus to:
receive interaction data corresponding to one or more interactions between a customer and a customer support representative and store said interaction data in said memory;
extract the stored interaction data from the memory and detect the presence of at least one language associated with the interaction data by comparing whole text strings or portions of text in the interaction data with available language detection models for different languages, and predicting a best matching language corresponding to the interaction data;
generate textual content in a plurality of languages corresponding to the interaction data based at least in part on translating the interaction data using two or more languages different than the at least one language;
determine at least one emotion score for text corresponding to each language from among the plurality of languages;
determine an aggregate emotion score using the at least one emotion score for the text corresponding to the each language;
model an interaction experience of the customer based at least in part on the aggregate emotion score; and
provide at least one recommendation to the customer based on said modeled interaction experience.

11. The apparatus of claim 10, wherein the apparatus is further caused to:
predict a net experience score corresponding to the one or more interactions based on the aggregate emotion score, wherein the predicted net experience score is configured to facilitate the modeling of the interaction experience of the customer.

12. The apparatus of claim 11, wherein the apparatus is further caused to:
receive information comprising at least one of a customer satisfaction (CSAT) score, a net promoter score (NPS), customer survey data and agent survey data; and
execute a supervised or an unsupervised classifier on the received information and the aggregate emotion score to predict the net experience score corresponding to the one or more interactions.

13. The apparatus of claim 10, wherein at least one interaction from among the one or more interactions comprises code-mixed content.

14. The apparatus of claim 10, wherein the apparatus is further caused to:
   parse the text corresponding to the each language to generate a plurality of tokens;
   perform pre-processing of the plurality of tokens based at least in part on normalization and error correction of at least one token from among the plurality of tokens;
   configure a plurality of segmented text portions corresponding to the each language upon the pre-processing of the plurality of tokens; and
   determine an emotion score for at least one segmented text portion from among the plurality of segmented text portions,
   wherein determining the emotion score for the at least one segmented text portion facilitates the determination of the at least one emotion score for the text corresponding to the each language.

15. The apparatus of claim 10, wherein the apparatus is further caused to:
   perform correction of the at least one emotion score based on at least one of a semantic analysis, a sarcasm analysis, an experiential analysis, and an engagement-based analysis of the text.

16. The apparatus of claim 10, wherein the aggregate emotion score is determined by performing one of averaging or weighted averaging of the at least one emotion score.

17. The apparatus of claim 10, wherein the aggregate emotion score is determined to be one of a highest emotion score or a lowest emotion score from among the at least one emotion score.

18. A non-transitory computer-readable medium storing a set of instructions that when executed cause a computer to perform a method comprising:
   receiving interaction data corresponding to one or more interactions between a customer and a customer support representative and storing said interaction data in a memory;
   extracting the stored interaction data from the memory and detecting the presence of at least one language associated with the interaction data by comparing whole text strings or portions of text in the interaction data with available language detection models for different languages, and predicting a best matching language corresponding to the interaction data;
   generating textual content in a plurality of languages corresponding to the interaction data based at least in part on translating the interaction data using two or more languages different than the at least one language;
   determining at least one emotion score for text corresponding to each language from among the plurality of languages;
   determining an aggregate emotion score using the at least one emotion score for the text corresponding to the each language;
   modeling an interaction experience of the customer based at least in part on the aggregate emotion score; and
   providing at least one recommendation to the customer based on said modeled interaction experience.

19. The computer-readable medium of claim 18, further comprising:
   predicting a net experience score corresponding to the one or more interactions based on the aggregate emotion score, wherein the predicted net experience score configured to facilitate the modeling of the interaction experience of the customer.

20. The computer-readable medium of claim 19, further comprising:
   receiving information comprising at least one of a customer satisfaction (CSAT) score, a net promoter score (NPS), customer survey data and agent survey data; and
   executing a supervised or an unsupervised classifier on the received information and the aggregate emotion score to predict the net experience score corresponding to the one or more interactions.

* * * * *